Figure 1:
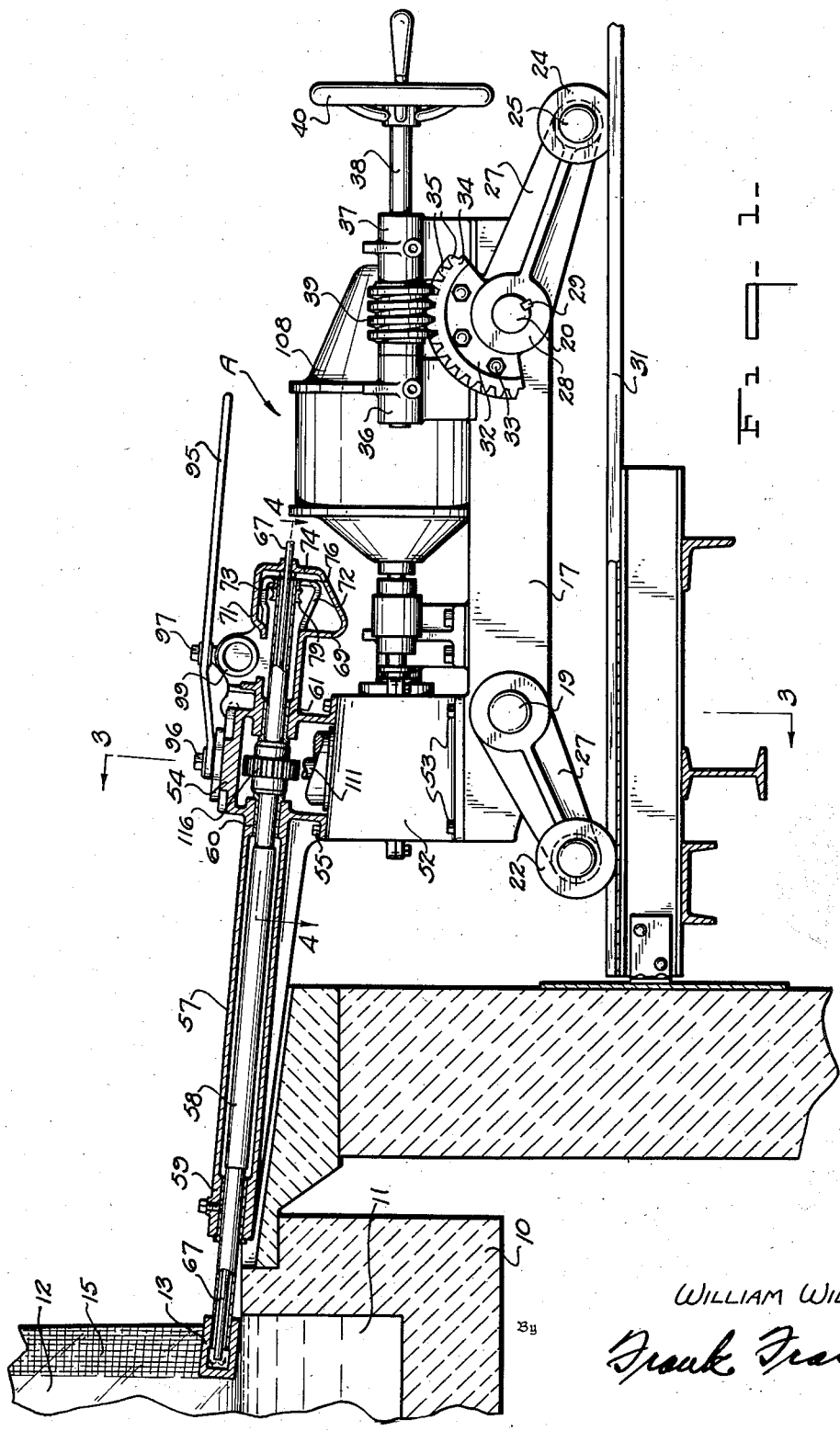

July 9, 1935.  W. WILDERMUTH  2,007,782
SHEET GLASS APPARATUS
Filed May 1, 1933  4 Sheets-Sheet 1

Inventor
WILLIAM WILDERMUTH.
By Frank Fraser
Attorney

July 9, 1935.  W. WILDERMUTH  2,007,782
SHEET GLASS APPARATUS
Filed May 1, 1933  4 Sheets-Sheet 2

Inventor
WILLIAM WILDERMUTH.
Frank Fraser
Attorney

July 9, 1935. W. WILDERMUTH 2,007,782

SHEET GLASS APPARATUS

Filed May 1, 1933 4 Sheets-Sheet 3

Inventor
WILLIAM WILDERMUTH.
By Frank Fraser
Attorney

July 9, 1935.    W. WILDERMUTH    2,007,782
SHEET GLASS APPARATUS
Filed May 1, 1933    4 Sheets-Sheet 4
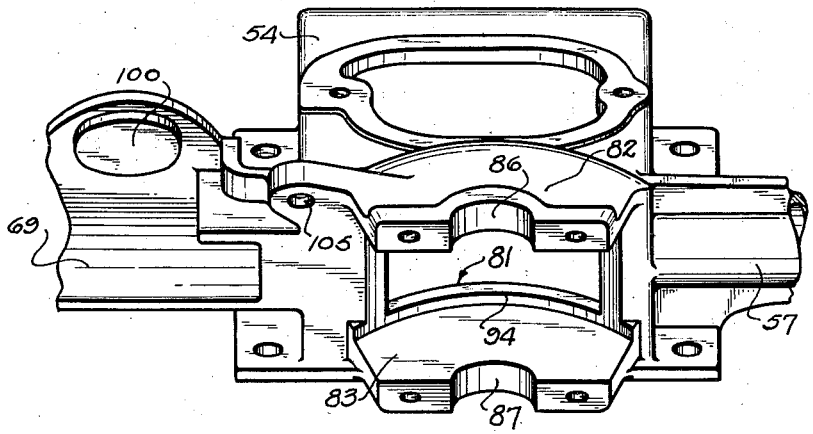
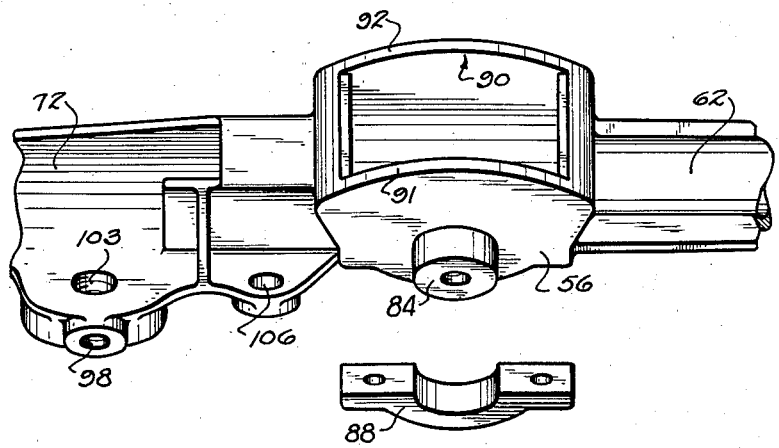
Fig. 5.
Inventor
WILLIAM WILDERMUTH.
By Frank Fraser
Attorney Patented July 9, 1935

2,007,782

UNITED STATES PATENT OFFICE 2,007,782

SHEET GLASS APPARATUS

William Wildermuth, Lancaster, Ohio, assignor to Libbey-Owens-Ford Glass Company, Toledo, Ohio, a corporation of Ohio Application May 1, 1933, Serial No. 668,759

11 Claims. (Cl. 49—17)

The present invention relates broadly to the art of producing sheet glass and more particularly to improvements in the apparatus employed for maintaining the sheet being formed at a substantially constant uniform width.

Although this invention is not limited to use with any particular system of producing sheet glass, yet it has been especially designed for and is of utility when employed in connection with a continuous sheet glass drawing machine of the general type exemplified in the patent to Colburn, No. 1,248,809, granted December 4, 1917. In such machine, a continuous sheet of glass is drawn upwardly from a bath of molten glass and then while still in a semi-plastic condition, although substantially set in its final sheet form, is deflected into the horizontal plane about a suitable bending member and carried horizontally into and through an annealing leer. As is well known in the art, some means must be provided to maintain the width of the sheet being drawn; otherwise it will gradually narrow down and eventually draw to a thread. In the commercial operation of the Colburn machine, it has been customary to make use of so-called knurled rollers which are positioned to engage opposite sides of the glass sheet at each edge thereof and which are driven in a manner to maintain the said sheet to width. These knurled rollers are usually positioned to engage the base or meniscus of the sheet being formed.

An important object of this invention is the provision of novel means for supporting the knurled rollers at each edge of the glass sheet being formed in such a manner that the said rollers may be readily and conveniently moved into operative relation with respect to the sheet or out of such position for the purpose of repair or replacement.

Another object of the invention is the provision of a knurled roller unit at each edge of the glass sheet embodying means for raising and lowering the rollers, together with means for adjusting the angle of the said rollers relative to the sheet being drawn to meet different operating conditions.

A further object of the invention is the provision of novel means for effecting the continuous circulation of a cooling fluid through the knurled rollers whereby to prevent overheating thereof and also to exert a cooling effect upon the edge of the glass sheet.

Other objects and advantages of the invention will become more apparent during the course of the following description when taken in connection with the accompanying drawings.

Figure 2:
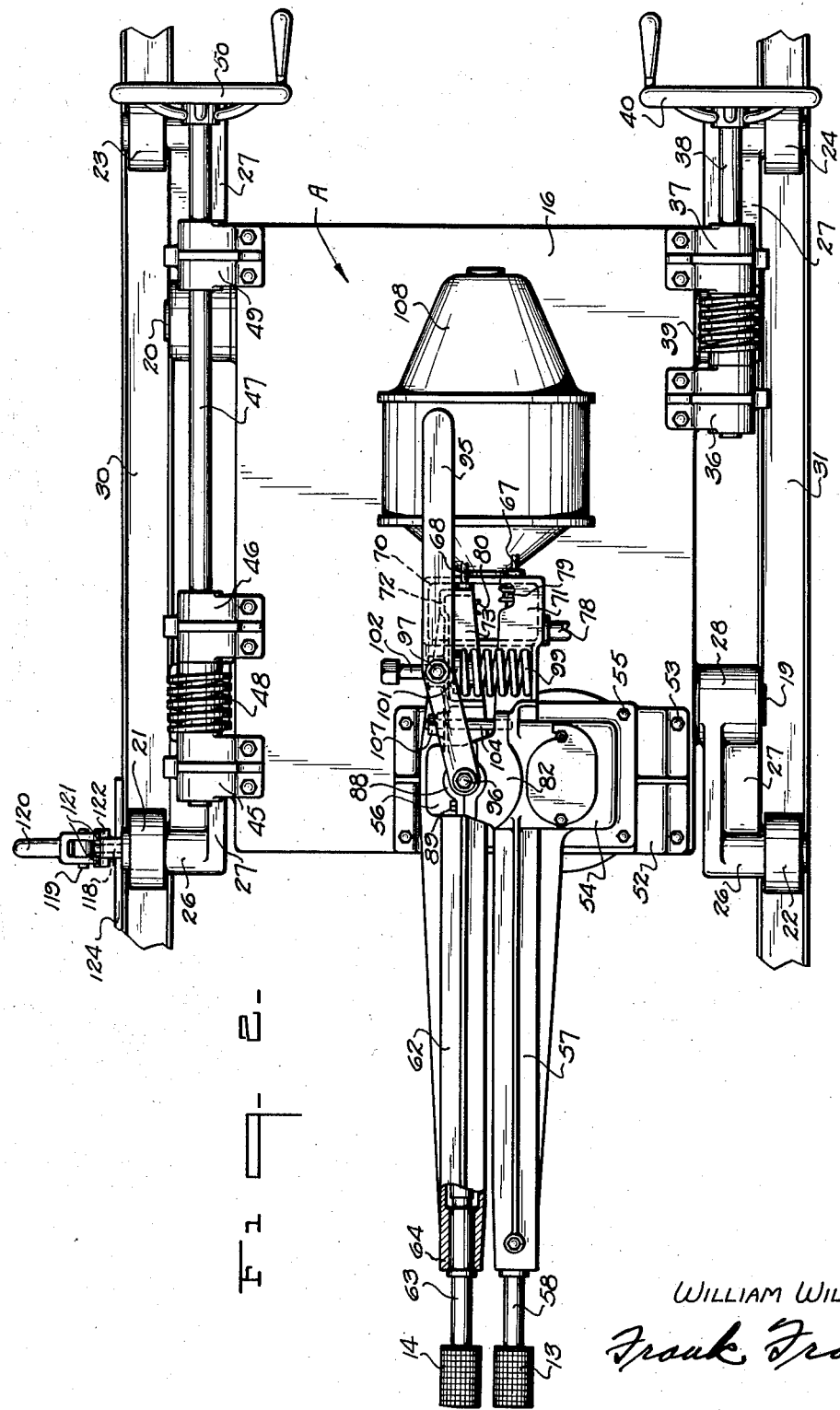
Figure 3:
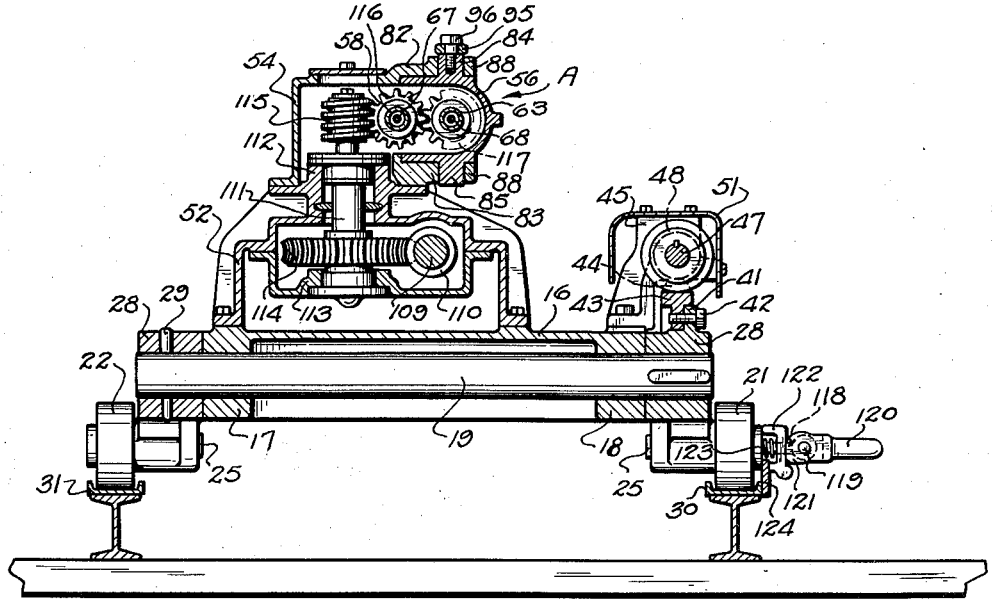
Figure 4:
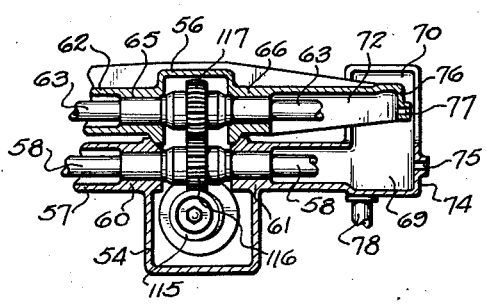

In the drawings wherein like numerals are employed to designate like parts throughout the same, Fig. 1 is a side elevation, partially in section, of one of the knurled roller units constructed in accordance with the present invention and shown in operative relation with respect to one edge of the glass sheet being formed, Fig. 2 is a plan view thereof, Fig. 3 is a transverse section taken substantially on line 3—3 of Fig. 1, Fig. 4 is a detail section taken substantially on line 4—4 of Fig. 1, and Fig. 5 is a plan view showing the supporting casings for the knurled rollers disassociated and turned at an angle away from one another.

Although, as pointed out above, the present invention is not limited to use in connection with any one system of producing sheet glass, it is particularly adapted to those systems wherein the glass sheet is drawn upwardly from a bath of molten glass. For example, in Fig. 1 of the drawings, the numeral 10 designates a relatively shallow receptacle or draw-pot containing a bath of molten glass 11 from which the sheet 12 is being drawn upwardly. The sheet 12 may be annealed while being carried vertically or it may be deflected into the horizontal plane and passed horizontally through an annealing leer. In either case, however, and in the absence of suitable width maintaining devices, the sheet does not keep a desired width. To prevent this narrowing of the sheet, it has been customary to provide a pair of knurled rollers 13 and 14 engaging opposite sides of the glass sheet at each edge thereof. These rollers are preferably driven in the direction of movement of the sheet but at a relatively slower speed and function to maintain the said sheet to width. The action of the knurled rollers results in the formation of relatively heavy knurled edge portions 15 on the glass sheet. Inasmuch as the knurled roller units at opposite edges of the glass sheet are identical in construction and operation, only one unit has been illustrated in the drawings and will be described in detail herein. However, it is to be understood that the apparatus is simply duplicated at opposite edges of the sheet.

The knurled roller unit is designated in its entirety by the letter A and includes a supporting table or carriage comprising a substantially horizontal top member or platform 16 rectangular in plan and upon which the respective knurled rollers 13 and 14 and associated parts are mounted.

The platform 16 is provided along the opposite side edges thereof with the longitudinally extending depending side pieces or flanges 17 and 18 respectively which provide bearings for the transverse shafts 19 and 20, the shaft 19 carrying at its opposite ends supporting wheels 21 and 22, while the shaft 20 carries at its opposite ends similar wheels 23 and 24.

The shafts 19 and 20 pass transversely through the side flanges 17 and 18 adjacent the front and rear ends respectively of the platform 16 and project outwardly therebeyond. Each of the four supporting wheels 21, 22, 23 and 24 is rotatably mounted upon a transverse stub shaft 25 carried in a bearing portion 26 formed at the outer end of an arm 27, the inner end of said arm being also formed with a bearing portion 28 for receiving the adjacent end of the respective shaft 19 or 20 therethrough. The arm 27 is fixed to the shaft by a key or the like 29 so as to turn therewith.

The wheels 21 and 23 are supported upon and adapted to run along within a channel beam 30, while the wheels 22 and 24 are supported upon and run along within a similar channel beam 31. These channel beams are rigidly supported at the side of the sheet glass forming machine and extend transversely thereof so that the knurled roller unit A can be moved bodily laterally of the machine into or out of operative position.

Carried by or formed integral with the bearing portion 28 of the arm 27 carrying supporting wheel 24 is an arcuate flange 32 (Fig. 1) to which is secured, by means of bolts or screws 33, an arcuately curved rack bar or segment 34 having formed upon its outer face the teeth 35. Mounted upon the platform 16 opposite the segment 34 are the spaced bearings 36 and 37 within which is mounted a horizontal shaft 38. Fixed to this shaft between the bearings 36 and 37 is a worm 39 meshing with the teeth 35 of segment 34. Carried at the outer end of shaft 38 is a hand wheel 40 to facilitate rotation thereof. Upon turning of the shaft 38, the worm 39 meshing with the teeth on segment 34 will impart a rotary motion to the shaft 20 and effect the raising or lowering of the arms 27 and consequently the rear end of platform 16.

Also carried by or formed integral with the bearing portion 28 of the arm 27 carrying supporting wheel 21 is an arcuate flange 41 (Fig. 3) to which is secured by screws or the like 42 a segment 43 similar to segment 34 and being provided with a series of teeth 44. Mounted upon the platform 16 opposite the segment are the spaced bearings 45 and 46 within which is journaled a shaft 47, said shaft having keyed thereto a worm 48 meshing with the teeth on segment 43. The shaft 47 extends rearwardly through a third bearing 49 and carries at its outer end a hand wheel 50. Upon rotation of shaft 47, it will be seen that shaft 19 will be likewise rotated through the intermediary of the worm 48 and segment 43 whereby to effect the raising or lowering of the forward end of platform 16.

From the above, it will be seen that by properly manipulating the two hand wheels 40 and 50, the operator can raise or lower the knurled rollers 13 and 14 bodily vertically or by tilting the platform 16 can tilt the knurls so that they will be inclined at the desired angle with respect to the edge of the glass sheet. This tilting adjustment of the knurled rollers is desirable in order to meet different operating conditions. An inverted substantially U-shaped guard 51 (Fig. 3) may be arranged over each worm 39 and 48, if preferred, so as to protect the same.

Mounted upon the platform 16, adjacent the forward end thereof, is a housing 52 fastened to the said platform by screws or the like 53. Supported upon the top of housing 52 is a stationary casing 54 suitably secured thereto by screws or other fastening elements 55. Associated with the stationary casing 54 is a movable casing 56 pivotally carried by the said stationary casing in a manner to be more fully hereinafter described.

Carried by or formed integral with the stationary casing 54 is a forwardly extending upwardly inclined bearing sleeve 57 within which is arranged a tubular member 58, said member projecting forwardly beyond the sleeve and having fixed upon its outer end the knurled roller 13 which, as shown in Fig. 1, is hollow so that a suitable temperature control medium, such as water or the like, may be circulated therethrough. The sleeve 57 is provided at its opposite ends with bearings 59 and 60 within which the tubular member 58 is rotatably mounted. The said tubular member 58 also projects rearwardly through the casing 54 and is supported in a third bearing 61 with which the said casing is formed.

Carried by or formed integral with the movable casing 56 is a forwardly extending upwardly inclined bearing sleeve 62 similar to bearing sleeve 57 and within which is arranged a tubular member 63, to the outer end of which is fixed the knurled roller 14. The bearing sleeve 62 is also provided at its opposite ends with bearings 64 and 65 (Figs. 2 and 4) within which the tubular member 63 is journaled. The said tubular member 63 projects rearwardly through the casing 56 and is supported in a third bearing 66 formed upon the said casing.

A circulation of water or other cooling fluid is adapted to be maintained through each of the knurled rollers 13 and 14 to prevent overheating thereof and also to exert a cooling effect upon the edge of the glass sheet. To this end, there is arranged longitudinally within the tubular members 58 and 63 and concentric thereof, the inlet pipes 67 and 68 respectively, the outer ends of said pipes preferably projecting slightly beyond the tubular members into the knurled rollers 13 and 14. The water or other cooling fluid flows in through the pipes 67 and 68 and, after circulating through the knurled rollers, flows outwardly through the tubular members 58 and 63 in surrounding relation to the said pipes.

Formed integral with the stationary casing 54 and extending rearwardly therefrom is a receptacle 69 having at its outer end a lateral extension 70, said receptacle being provided with a cover 71 which, however, is not arranged over the lateral extension 70. Formed integral with the movable casing 56 and also extending rearwardly therefrom is a trough 72, the outer end of which overhangs the lateral extension 70 of receptacle 69 as shown in Figs. 1, 2 and 4, said trough being likewise provided with a cover 73.

The tubular member 58 carrying knurled roller 13 terminates at its inner end just short of the outer end wall 74 of receptacle 69 while the inlet pipe 67 projects rearwardly through an opening 75 in the end wall of said receptacle. Likewise, the tubular member 63, carrying knurled roller 14, terminates at its inner end just short of the outer end wall 76 of trough 72, while the inlet pipe 68 projects rearwardly through an opening 77 in the said end wall of the trough. The cooling fluid discharged from the inner end of the tubular member 58 is received within the receptacle 59 and is permitted to flow therefrom through a drain pipe 78 while the cooling fluid flowing from the inner end of tubular member 63 discharges first into the trough 72 from which it passes into receptacle 69 and thence out through the drain pipe 78.

The tubular members 58 and 63 are preferably provided at their inner ends with collars or the like 79 and 80 respectively which are so constructed and arranged as to prevent the cooling fluid being discharged therefrom from creeping back along the said tubular members.

The stationary casing 54 is open at its inner side as indicated at 81 in Fig. 5 and extending laterally from this opening are the spaced parallel upper and lower extensions 82 and 83 respectively between which the movable casing 56 is adapted to be received, said movable casing being supported upon the lower extension 83. In order to movably secure the movable casing 56 to the stationary casing 54, the said movable casing is formed with aligned vertical trunnions 84 and 85 which are received within the semicircular notches or cutaway places 86 and 87 formed in the upper and lower extensions 82 and 83 respectively, the said movable casing being secured in place by plates 88 shaped to fit around the outer portions of the trunnions 84 and 85 and being fastened to the said extensions by screws or the like 89. Thus, the extensions 86 and 87 cooperate with the plates 88 to provide bearings for the trunnions 84 and 85.

The inner side of the movable casing 56, adjacent stationary casing 54, is also open as indicated at 90 in Fig. 5, and is shaped so as to provide the arcuately curved edges 91 and 92 which fit against the correspondingly curved flanges or ribs 93 and 94 respectively formed on stationary casing 54. As a consequence, it will be readily apparent that with such a construction, the movable casing will be permitted to pivot with respect to the stationary casing upon the trunnions 84 and 85 whereby to effect movement of the knurled roller 14 toward and away from the stationary knurled roller 13.

In order to effect this pivotal movement of the movable casing 56, there may be provided an operating handle 95 pivoted at one end to the trunnion 84 of the said movable casing by a screw 96 and likewise pivoted intermediate its ends by means of a bolt 97 threaded through an opening 98 formed in the side wall of trough 72 (Fig. 5). Thus, upon swinging of the operating handle 95 about its pivot 97, the movable casing will be caused to pivot upon the trunnions 84 and 85 so as to move the knurled roller 14 toward or away from stationary roller 13.

The knurled rollers are normally yieldably urged toward one another by means of a compression spring 99, one end thereof bearing against the side wall of receptacle 69 and being held against lateral movement by a disc 100 which is received therein, while the opposite end of said spring bears against a plate 101 carried at the inner end of a screw 102 threaded through an opening 103 (Fig. 5) in the side wall of trough 72. The compression of the spring 99 may be readily determined by suitably adjusting the screw 102. The inward movement of knurled roller 14 toward roller 13 is limited by a stop bolt 104 threaded at one end within an opening 105 in stationary casing 54 and passing loosely through an opening 106 in movable casing 56 (Fig. 5). Threaded upon the bolt 104 outwardly of the movable casing 56 is a nut 107.

The knurled rollers 13 and 14 are driven in opposite directions from a variable speed motor 108 mounted upon platform 16. This motor drives, through suitable drive connections, a horizontal shaft 109 journaled in housing 52 and having keyed thereto a worm 110. Also arranged within housing 52 is a vertical shaft 111 journaled in bearings 112 and 113 and having keyed thereto a worm gear 114 meshing with the worm 110 on shaft 109. The vertical shaft 111 projects upwardly into the stationary casing 54 and has keyed thereto a worm 115 meshing with a worm gear 116 keyed to the tubular member 58, said worm gear 116 meshing with a similar gear 117 carried by tubular member 63 within movable casing 56. From the above, it will be apparent that upon operation of the motor 108 to drive the intermeshing gears 116 and 117, the tubular members 58 and 63 and likewise the knurled rollers 13 and 14 will be caused to rotate in opposite directions.

As pointed out above, the knurled roller unit A is movably mounted upon the channel beams 30 and 31 so that the knurled rollers 13 and 14 may be readily and conveniently moved into operative relation with respect to the sheet edge or out of such position whenever desired for the purpose of repair or replacement. This invention also contemplates the provision of means for locking the knurled roller unit in place after it has been moved along the channel beams to the desired position and to this end the stub axle 25, carrying supporting wheel 21, may be formed with a horizontal extension 118, to the outer end of which is pivoted, as at 119, a cam lever 120 formed at its inner end with cam faces 121. Slidable upon the extension 118 inwardly of the cam lever is a substantially U-shaped block 122 and encircling the extension inwardly of the block is a compression spring 123, said spring acting to normally urge the said block outwardly. Secured to the channel beam 30 is a vertical plate 124 adapted to be engaged by the block 122.

During the movement of the knurled roller unit A along the channel beams 30 and 31, the cam lever 120 is moved to assume a substantially vertical position whereupon the block 122 will be urged outwardly away from plate 124 by spring 123. However, when it is desired to lock the unit in place, the operator throws the cam lever downwardly into a substantially horizontal position, as shown in Fig. 3, thereby forcing the block 122 inwardly against the action of spring 123 and into engagement with the plate 124 whereby the unit will be locked in position.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, wherein the sheet is drawn upwardly from a bath of molten glass, a pair of width maintaining members engaging opposite sides of the sheet at each edge thereof, a carriage upon which said members are mounted and including a substantially horizontal platform, wheels supporting the carriage, rails extending transversely with respect to the sheet and upon which the said wheels are adapted to run whereby the said carriage may be moved bodily transversely of said sheet to bring the width maintaining members into or out of operative relation with respect thereto, and means for swinging said wheels about horizontal axes to move the platform and width maintaining members vertically.

2. In sheet glass apparatus, wherein the sheet is drawn upwardly from a bath of molten glass, a pair of width maintaining members engaging opposite sides of the sheet at each edge thereof, a carriage upon which said members are mounted and including a substantially horizontal platform, wheels supporting the carriage adjacent the opposite ends thereof, rails extending transversely with respect to the sheet and upon which the said wheels are adapted to run whereby the said carriage may be moved bodily transversely of said sheet to bring the width maintaining members into or out of operative relation with respect thereto, and means for independently swinging the wheels at the opposite ends of the carriage about horizontal axes to move the said platform and width maintaining members vertically or to tilt the same.

3. In sheet glass apparatus, wherein the sheet is drawn upwardly from a bath of molten glass, a pair of width maintaining members engaging opposite sides of the sheet at each edge thereof, a carriage upon which said members are mounted and including a substantially horizontal platform, transverse shafts carried by the carriage adjacent the opposite ends thereof, wheels carried by said shafts and supporting the carriage, rails extending transversely with respect to the sheet and upon which the said wheels are adapted to run whereby the said carriage may be moved bodily transversely of said sheet to bring the width maintaining members into or out of operative relation with respect thereto, and separate means for independently rotating said shafts to effect vertical or tilting movement of the platform and width maintaining members.

4. In sheet glass apparatus, wherein the sheet is drawn upwardly from a bath of molten glass, a pair of rollers engaging opposite sides of the sheet at each edge thereof to maintain the said sheet to width, a portable wheeled carriage, a stationary casing mounted upon the carriage and supporting one of said rollers, a movable casing carried by said stationary casing and supporting the other roller, and means for moving the movable casing relative to the stationary casing to move the roller supported thereby toward or away from the roller supported by the stationary casing.

5. In sheet glass apparatus, wherein the sheet is drawn upwardly from a bath of molten glass, a pair of rollers engaging opposite sides of the sheet at each edge thereof to maintain the said sheet to width, a portable wheeled carriage, a stationary casing mounted upon the carriage and supporting one of said rollers, a movable casing carried by said stationary casing and supporting the other roller, means for moving the movable casing relative to the stationary casing to move the roller supported thereby toward or away from the roller supported by the stationary casing, means for driving said rollers, and means for yieldably urging the said rollers toward one another.

6. In sheet glass apparatus, wherein the sheet is drawn upwardly from a bath of molten glass, a pair of rollers engaging opposite sides of the sheet at each edge thereof to maintain the said sheet to width, a portable wheeled carriage, a stationary casing mounted upon the carriage and supporting one of said rollers, a movable casing pivotally carried by said stationary casing and supporting the other roller, means for pivoting the movable casing relative to the stationary casing to move the roller supported thereby toward or away from the roller supported by the stationary casing, means for driving said rollers, and means for circulating a cooling fluid therethrough.

7. In sheet glass apparatus, wherein the sheet is drawn upwardly from a bath of molten glass, a pair of rollers engaging opposite sides of the sheet at each edge thereof to maintain the said sheet to width, a portable wheeled carriage, a stationary casing mounted upon the carriage and supporting one of said rollers, a movable casing carried by said stationary casing and supporting the other roller, means for moving the movable casing relative to the stationary casing to move the roller supported thereby toward or away from the roller supported by the stationary casing, means for circulating a cooling fluid through the rollers including inlet pipes feeding into the said rollers and tubular members for conducting the cooling fluid therefrom, a receptacle carried by the stationary casing, and a trough carried by the movable casing and positioned to overhang said receptacle, the cooling fluid issuing from one tubular member being received directly within the receptacle while the cooling fluid discharged from the other tubular members flow first into the trough and thence into said receptacle.

8. In sheet glass apparatus, wherein the sheet is drawn upwardly from a bath of molten glass, a portable wheeled carriage, a stationary casing mounted upon the carriage, a movable casing carried by said stationary casing, forwardly extending bearing sleeves carried by the said stationary and movable casings, tubular members rotatably supported within the bearing sleeves and projecting therebeyond at the outer ends thereof, knurled rollers carried by the tubular members and engaging opposite sides of the sheet at the edge thereof, means for rotating the knurled rollers, means for circulating a cooling fluid therethrough, and means for moving the movable casing relative to the stationary casing to move the knurled rollers toward or away from one another.

9. In sheet glass apparatus, wherein the sheet is drawn upwardly from a bath of molten glass, a portable wheeled carriage, a stationary casing mounted upon the carriage, a movable casing carried by said stationary casing, forwardly extending bearing sleeves carried by the said stationary and movable casings, tubular members rotatably supported within the bearing sleeves and projecting therebeyond at the outer ends thereof, knurled rollers carried by the tubular members and engaging opposite sides of the sheet at the edge thereof, means for rotating the knurled rollers, means for moving the movable casing relative to the stationary casing to move the knurled rollers toward or away from one another, and means for circulating a cooling fluid through said rollers including inlet pipes extending longitudinally through the tubular members and feeding into the knurled rollers, a receptacle carried by the stationary casing and projecting rearwardly therefrom, and a trough carried by the movable casing and also extending rearwardly therefrom in overhanging relation to said receptacle, the cooling fluid issuing from one tubular member directly into the receptacle, while the cooling fluid is discharged from the other tubular member first into said trough from which it flows into said receptacle.

10. In sheet glass apparatus, wherein the sheet is drawn upwardly from a bath of molten glass, a portable wheeled carriage including a substantially horizontal platform, a housing mounted upon said platform, a stationary casing supported upon said housing, a movable casing pivotally carried by said stationary casing, forwardly extending bearing sleeves carried by the said stationary and movable casings, tubular members rotatably supported within the bearing sleeves and projecting therebeyond at the outer ends thereof, knurled rollers carried by the tubular members and engaging opposite sides of the glass sheet at the edge thereof, a vertical shaft journaled within said housing, a motor mounted upon said platform, operative drive connections between said motor and shaft, and operative drive connections between said shaft and tubular members carrying the knurled rollers.

11. In sheet glass apparatus, wherein the sheet is drawn upwardly from a bath of molten glass, a pair of width maintaining members engaging opposite sides of the sheet at each edge thereof, a carriage upon which said members are mounted, a transverse shaft carried by the carriage adjacent each end thereof, arms secured to each shaft at opposite ends thereof, wheels carried at the outer ends of said arms and supporting the carriage, rails extending transversely with respect to the glass sheet and upon which the said wheels are adapted to run whereby the said carriage may be moved bodily transversely of said sheet to bring the width maintaining members into or out of operative relation with respect thereto, a rack bar carried by one of the arms on each shaft, worms mounted upon the carriage and engaging the rack bars, and separate means for independently rotating said worms to effect rotation of the shafts and cause vertical or tilting movement of the carriage and width maintaining members.

WILLIAM WILDERMUTH.